Nov. 8, 1966

E. L. CLARK 3,284,630

MEANS FOR DETERMINING FLUID INTERFACE
IN UNDERGROUND STORAGE SPACE

Filed May 7, 1963

INVENTOR.
E. L. CLARK

BY
*Young & Quigg*

ATTORNEYS

INVENTOR.
E. L. CLARK

United States Patent Office 3,284,630
Patented Nov. 8, 1966

3,284,630
MEANS FOR DETERMINING FLUID INTERFACE IN UNDERGROUND STORAGE SPACE
Ernest L. Clark, Bartlesville, Okla., assignor to Phillips Petroleum Company, a corporation of Delaware
Filed May 7, 1963, Ser. No. 278,663
1 Claim. (Cl. 250—43.5)

This invention relates to the determination of an interface between two fluids. In one aspect the invention relates to a method for determining a fluid interface in a storage space. In another aspect the invention relates to apparatus for determining a fluid interface in a storage space. In another aspect the invention relates to interface locating means.

The use of underground storage caverns particularly for the storage of volatile liquids such as liquefied petroleum gas, has become widespread as such storage has proved to be economical, safe and convenient. In many such caverns it is important that reliable means be provided to determine fluid interfaces, for example, a propane-water interface, a propane liquid-propane vapor interface, etc. Where the stored product is liquefied petroleum gas, there are two critical conditions when it is necessary to locate an interface (1) on filling and (2) on emptying. Most critical of the two conditions is during the filling process, to prevent overfilling of the cavern with the result that the product is pumped out of the cavern creating a fire hazard and other inconvenience due to escaping product.

An object of my invention is to determine a fluid interface in a storage space, without opening the storage space.

Another object of my invention is to provide safe, economical and convenient means for determining a fluid interface in an underground storage chamber.

Another object of my invention is to provide an improved logging probe.

Other aspects, objects, and the advantages of my invention are apparent from the written description, the drawing and the claims.

According to my invention there is provided an improved logging probe comprising a gamma ray source, a gamma ray detector, and means for converting low voltage electrical power to high voltage electrical power to supply said gamma ray detector. Particularly where the probe is used to determine a fluid interface associated with a highly volatile and inflammable liquid it is preferred that transmission between the surface and the probe be limited to low voltage, preferably less than about 20 volts. On the other hand, high voltage is required to operate a suitable gamma detector, a voltage in the order of 500 to 2000 volts. By using the probe of my invention a low voltage, one considered to be safe from the standpoint of probability of sparking, such as a voltage between about 2 and about 20 volts, is transmitted through a conductor of a supporting cable and is converted to a high voltage within the probe housing itself.

Further, according to my invention there is provided a method and a complete system for determining a fluid interface remotely by lowering the probe of my invention into a storage space from a locus outside the storage space, bombarding the storage space with gamma radiation from a source in the probe and detecting gamma radiation from the storage space with the detector in the probe, transmitting low voltage power through a conductor to the probe and transforming the low voltage in the probe to a high voltage to operate the detector, and transmitting the output signal of the detector to the locus.

With a measuring device, or probe, comprising a source of gamma radiation, a gamma ray detector, and converting means for converting low voltage electrical power to a high voltage electrical power and applying the high voltage power to the gamma ray detector, a cable is attached to the measuring device for lowering and raising the device, a first conductor of the cable being connected electrically at the measuring device with the converting means and at its other end with a source of low voltage electrical power and a second conductor of the cable being connected with the output of the gamma ray detector to transmit an output signal therefrom to means outside the storage space to actuate a meter responsive to changes in the output signal. Preferably a count rate meter is used on the output from the gamma ray detector and used to actuate a switch which connects a light. A preferred count rate meter includes an amplifier, a pulse shaper, a cathode follower output, and means for converting the count pulses to a proportional voltage for application to an indicating dial and to operate the switch which controls the light.

In the drawing, FIGURE 1 is a vertical elevation of a cross section of the apparatus of the invention in use in an underground storage cavern.

Figure 1:
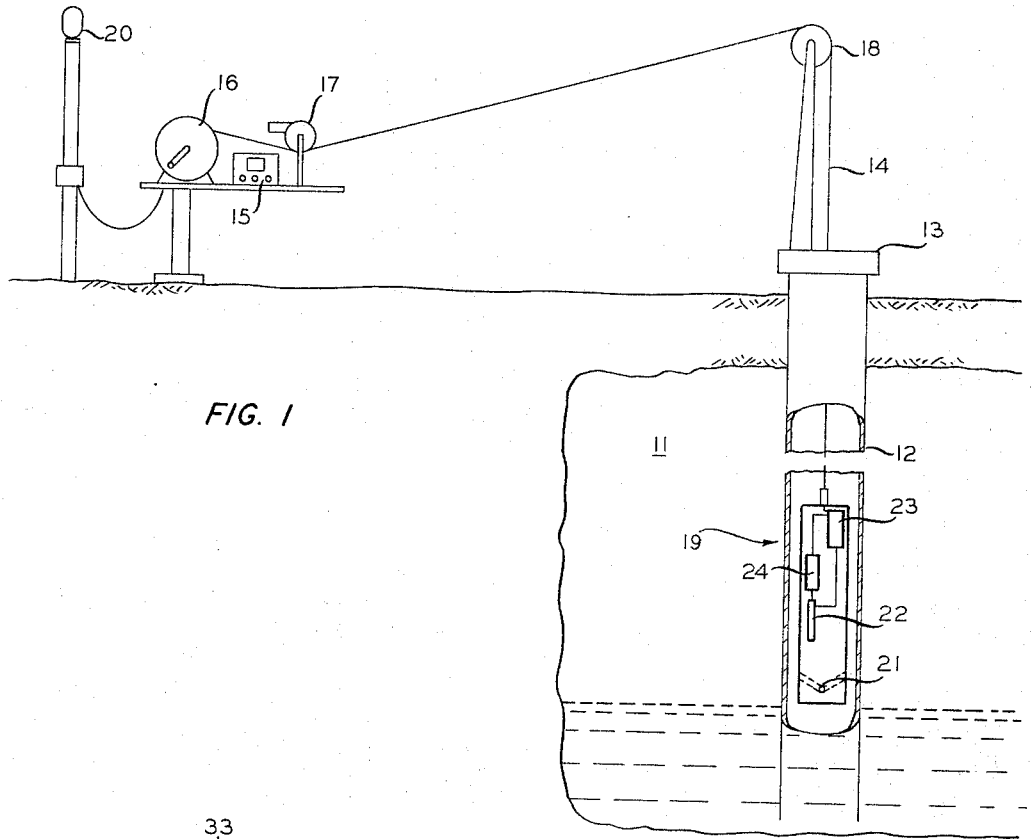

In FIGURE 1 an underground cavern 11 is provided with a casing 12 extending from above the surface of the ground to the lowest depth at which it is desired to determine a fluid interface, the lower end being closed, thus preventing inlet of the fluid stored in the cavern. At the surface of the ground the casing 12 is provided with a packing gland 13 through which runs a cable 14 from cable reel 16 past the measuring shaft 17 of a suitable depth indicator and over guide shaft 18. It will be recognized that packing gland 13 can be omitted if desired when the lower end of casing 12 is closed. A logging probe 19 is supported on the lower end of cable 14 within casing 12, and comprises a radioactive source 21, a gamma detector 22, a converter 23, and an output amplifier 24.

A count rate meter 15 is provided for the output signal, and a light 20 is operated by a switch actuated by an integrated signal.

Figure 2:
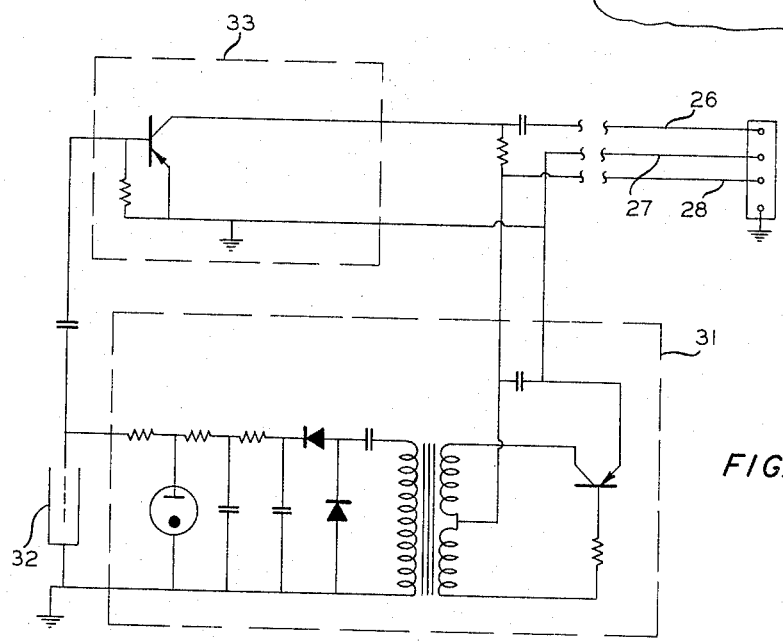
FIGURE 2 is a circuit diagram of cable connection means and the circuits in a logging probe.

In FIGURE 2, cable conductors 26, 27 and 28 are connected with a circuit 31 comprising a converter for transforming low voltage direct current to high voltage direct current for application to a Geiger tube 32. An amplifier 33 for the output from tube 32 is provided.

Figure 3:
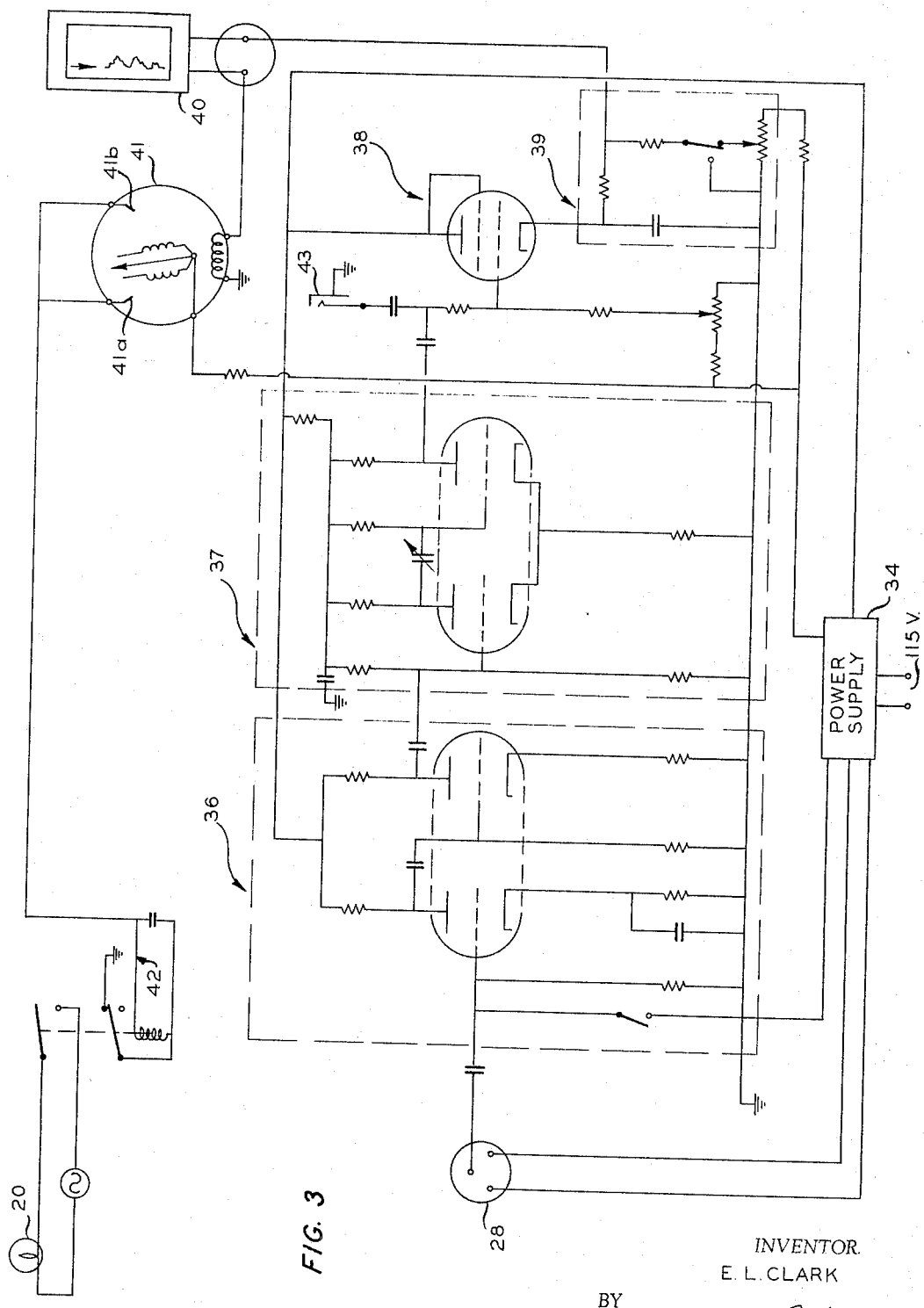
FIGURE 3 is a circuit diagram of equipment utilized at the indicating location.

FIGURE 3 is a schematic circuit diagram of equipment at the indicating location, including a power supply 34, an amplifier 36, a pulse shaping circuit 37, a cathode follower 38, a circuit for converting digital counts to an analog voltage 39, a recorder 40, a meter relay 41, a relay 42, and a warning light 20.

In operation, the logging probe 19 is suspended on cable 14 and lowered through casing 12 into cavern 11. The interface determination can be made by lowering the probe until the interface is reached or by positioning the probe at a desired upper or lower limit and noting the indication as the cavern is filled or emptied. The radioactive source 21 emits a constant stream of gamma rays through a window in its lead shielding (not shown). These gamma rays penetrate the casing walls and the surrounding fluid where they are scattered and absorbed in proportion to the average density of the fluid. Some of the gamma rays are deflected back through the casing walls and there detected by the gamma ray detector 22. (Geiger tube 32 in FIGURE 2.) If the area around the source is of low density, such as air or gas, the gamma rays must travel further before they strike molecules that absorb or deflect them and only a very few find their way back to the detector. Each gamma ray detected by the gamma detector is registered as an electrical pulse signal. These pulse signals are amplified in amplifier 33 and transmitted through the cable to the count rate meter at the surface where they are further amplified and integrated. The amplification, of course, occurs in amplifier 36, the pulses are shaped in pulse shaper 37, and integrated by circuit 39, recorder 40 and meter 41.

The radioactive source 21 in the apparatus illustrated is Cesium 137 of 75 millicuries in strength, having a half-life of 30 years. A suitable gamma detector is an Anton number 309, self-quenching, halogen-filled Geiger tube operating at 700 volts. Power for the tube is supplied from converter (oscillator amplifier circuit) 31, from power supply 34. Circuit 31 converts a 5 volt D.C. power supply to a 700 volt D.C. power supply for Geiger tube 32. The count rate meter 15 amplifies the output signal from the gamma detector to about 35 volts from the approximately 0.25 volt pulses transmitted from the probe. The amplified pulses trigger the pulse shaper. The pulses leaving the shaper are uniform in height and width and pass through the cathode follower circuit where they are applied to the capacitor of circuit 39 and converted to proportional voltage. The voltage across this capacitor is measured by a recorder 40 and meter relay 41. Meter relay 41 has contacts 41a and 41b which are adjusted to actuate relay 42 to trigger warning light 20. Preferably a time delay circuit is incorporated so that relay 42 holds for a few seconds before releasing, to cause the warning light to stay on for a few seconds during an "on and off" cycle.

One application of the invention involves the measurement of the liquid-vapor interface in a storage cavern used for storing liquefied petroleum gas, predominantly liquid propane. In this operation the count rate meter is adjusted to read nearly full scale when the probe is below the propane level and about half scale when the probe is above the liquid level. Some back scattering of gamma rays is caused by the casing 12 and the walls of the cavern 11 but these fall in the lower half of the meter scale. Liquid propane has a density of .503 and propane vapor has a density of about .002. In actual test the meter reads 75 on a scale of 100 with the probe below the liquid surface and about 10 when in the vapor above the liquid level. This corresponds with a count rate change of 15,000 to 18,000 counts per minute.

The meter used in the described operation has two adjustable contacts, one above the pointer needle, and one below. These contacts operate the warning light 20. The contact on the high end of the scale is set at a point where the meter needle makes contact when the probe is below the liquid surface. This actuates a relay which turns on the warning light. The setting is about 90 on the meter scale of 100. The contact on the low end of the scale is set at about 5. Should some malfunction occur in the count rate meter, such as a tube burnout or a blown fuse, the point on the meter falls to zero, this "fail-safe" action also turns on the warning light.

Where an operator wishes to find a present liquid-vapor interface, he lowers the probe into the well by means of a hand crank on reel 16. As the probe moves by the liquid vapor interface, the meter pointer passes up the scale. The operator then draws the probe up very slowly, about 1 foot per minute, and watches for a decrease in rate on the meter scale. This is a point at which the radioactive source emerges above the liquid level. The operator then stops the reel and reads the height from bottom on the depth indicator. For faster response an operator can use earphones which can be plugged into plug 43. While listening to the gamma ray count level he notices a definite change in rate as the probe moves through the interface. Preferably the meter pointer is adjusted for a delay, to smooth out statistical variations in gamma radiation which could cause a premature display of the indicating light. As noted above, the probe is designed to be suspended at a fixed point above or below the liquid surface and flashes the indicating light when an upper filling level or a lower emptying level is reached.

Reasonable variation and modification are possible within the scope of my invention which sets forth method and apparatus for determining the fluid interface remotely.

I claim:

Means for determining a fluid interface in an underground storage space, comprising:

a measuring device comprising a housing, means in said housing for generating and detecting gamma rays and amplifying the resulting signal comprising a source of gamma radiation, a gamma ray detector, convertor means for converting low voltage direct current electrical power to high voltage direct current electrical power and applying said high voltage power to said gamma ray detector, and amplifying means for the output from said gamma ray detector;

a cable attached to said housing for lowering and raising said device, a first conductor of said cable being electrically connected at said measuring device with said convertor means to supply low voltage direct current electrical power thereto, and a second conductor of said cable being connected with said gamma ray detector amplifier to transmit an amplified signal therefrom;

a source of low voltage direct current electrical power connected with the other end of said first conductor at the surface of the ground;

a reel for said cable;

a depth indicator for said cable;

a signal light;

a count rate meter connected with said second conductor at the ground, said count rate meter comprising an amplifier, a pulse shaper, a cathode follower circuit and a digital to analog circuit in the output of said cathode follower circuit;

a recorder communicating with the output of said rate countmeter;

an indicating meter communicating with the output of said count rate meter, said indicating meter having a switch associated therewith actuated at an extreme indication of said indicating meter; and a relay actuated by said switch to control the operation of said light.

References Cited by the Examiner

UNITED STATES PATENTS

| | | | |
|---|---|---|---|
| 2,493,536 | 1/1950 | Herzog | 250—83.6 |
| 2,942,112 | 6/1960 | Hearn | 250—83.6 |
| 2,963,588 | 12/1960 | Wilson | 250—83.6 |
| 2,972,679 | 2/1961 | Caldwell | 250—83.6 |
| 3,052,798 | 9/1962 | Firminhac | 250—83.6 |
| 3,065,346 | 11/1962 | Dewan | 250—83.6 |
| 3,127,511 | 3/1964 | Hall | 250—43.5 |

OTHER REFERENCES

Gamma Sonde Finds Interface in Propane Storage Reservoir, by Courtois et al., Nucleonics, January 1963, pp. 76 and 78.

RALPH G. NILSON, *Primary Examiner.*

JAMES W. LAWRENCE, *Examiner.*

A. R. BORCHELT, *Assistant Examiner.*